(No Model.)
E. B. LAKE.
VEHICLE WHEEL.
No. 439,408. Patented Oct. 28, 1890.
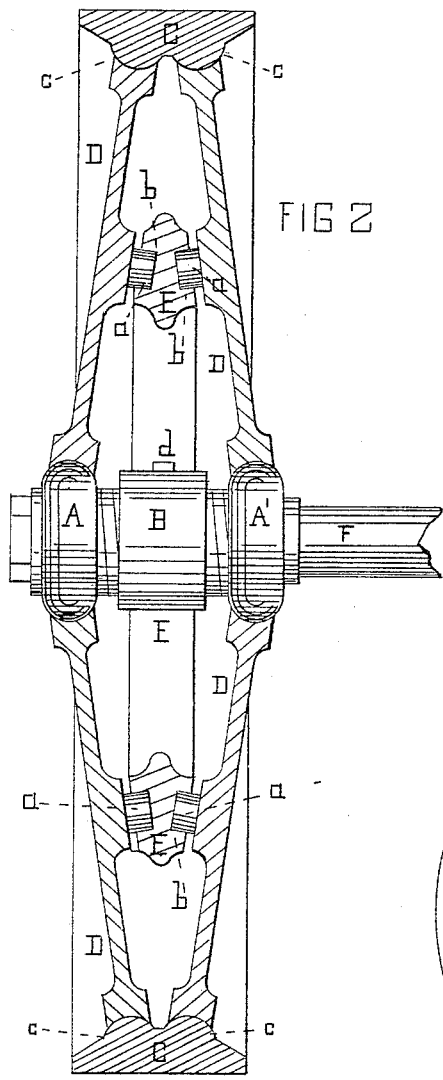
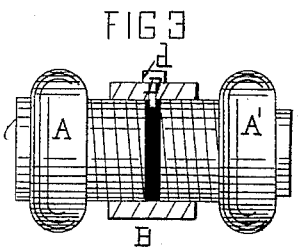
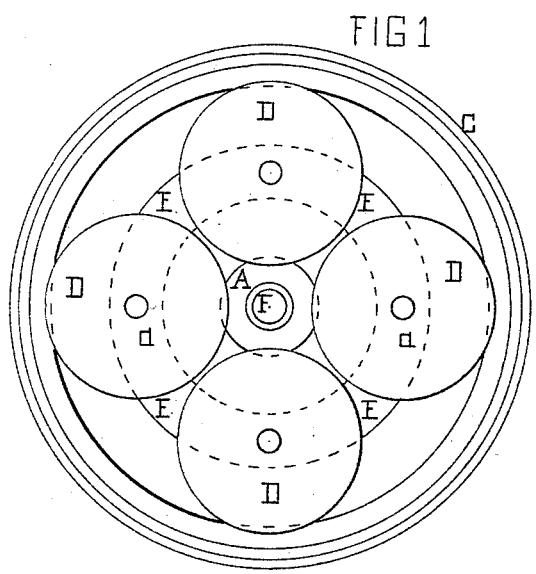
WITNESSES
J. F. Shannon
H. Wen Zeller
INVENTOR
Ezra B. Lake
By Francis D. Pastorius
Solicitor

UNITED STATES PATENT OFFICE.

EZRA B. LAKE, OF CAMDEN, NEW JERSEY.

VEHICLE-WHEEL.

SPECIFICATION forming part of Letters Patent No. 439,408, dated October 28, 1890.

Application filed January 22, 1890. Serial No. 337,721. (No model.)

*To all whom it may concern:*

Be it known that I, EZRA B. LAKE, a citizen of the United States, residing at Camden, in the county of Camden and State of New Jersey, have invented a new and useful Anti-Friction Wheel for Vehicles, &c., of which the following is a specification.

Instead of the spokes usually employed, the support of the felly is by means of intervening anti-friction wheels, which journal in a central spacing-ring and turn against the outer and inner surfaces, respectively, of the hub and felly. To keep the felly absolutely true and make it track perfectly, the anti-friction wheels converge from the hub to the felly, by which they serve for braces, and their slanting form makes the felly strong and sufficient to bear any unusual twist or increased force tending to wrench it.

On reference to the accompanying sheet of drawings, making part of this specification, Figure 1 is a side view of a wheel embodying my invention. Fig. 2 is an enlarged transverse and diametrical section, and Fig. 3 is a longitudinal section of the hub, Fig. 2.

Similar letters refer to similar parts in the several views.

A A' are ends, which screw or otherwise take into the collar B and make the hub of the wheel, of which C is the felly.

D are anti-friction wheels, centered and spaced apart by their studs $a$ bearing in openings $b$ of a concentric spacing-ring E. They converge from the hub to the felly, which they support in place of spokes, and roll over tracks $c\ e$ of the inner surface of the felly and the surface of the hub A A', respectively. The spacing-ring E is placed concentrically between the hub and felly and carried wholly by the anti-friction wheels D, with which it moves. In the case of a wagon-wheel where the felly turns and the axle does not the felly imparts its motion to the intermediate anti-friction wheels, which roll over the surface of the hub and give it no motion, or at least a very limited one, by which the friction on the axle is greatly reduced. When the axle turns and the felly does not, in a case where the invention is modified to apply to a car-wheel box, the hub turns with the axle and the anti-friction wheels have the motion of the hub imparted to them for rolling against the felly, as a rim, and thus reduce the friction of the axle.

The degree of bracing of the anti-friction wheels D with the hub A A' and felly C is regulated by screwing and unscrewing the parts composing the hub. I claim to modify the hub by dispensing with the screw-threads and substituting bolts or rivets therefor, in which case the collar B is useless. The rolling contact of the anti-friction wheels with the hub and felly may differ from that shown at $c\ e$, and the tread of said wheels may be of the ordinary car-pattern or other suitable shape. The spacing-collar E can be superseded by connecting-links, on the ends of which the anti-friction wheels turn and are spaced apart. Other modifications can be made without departing from the spirit of my invention, which is lessening the friction of the wheel and axle, and preventing any accidental twisting of the felly by the inequalities of the road or rolling surface or other causes tending to rupture it by torsion.

I claim as my invention—

1. A wheel provided with converging anti-friction wheels which support the felly and roll in contact with the hub and felly in spacing-journals, for the purpose shown and described.

2. A wheel provided with a divided hub in connection with converging anti-friction wheels, for the purpose shown and described.

In testimony whereof I affix my signature in presence of two witnesses.

EZRA B. LAKE.

Witnesses:
   WM. S. HOFFMAN,
   FRANCIS D. PASTORIUS.